July 30, 1946.  W. H. NEWELL  2,405,045

ELECTRICAL FOLLOW-UP

Original Filed Feb. 17, 1934

INVENTOR
*William H. Newell*
BY *Walter J. Gill*
ATTORNEY

Patented July 30, 1946

2,405,045

UNITED STATES PATENT OFFICE 2,405,045

ELECTRICAL FOLLOW-UP

William H. Newell, New York, N. Y., assignor to Ford Instrument Company, Inc., Long Island City, N. Y., a corporation of New York Application February 17, 1934, Serial No. 711,811
Renewed April 5, 1935

10 Claims. (Cl. 172—239)

This invention relates to a receiver unit of the follow-up type particularly adapted for use in electrical transmission systems in which the movement of one object is reproduced by a corresponding movement of another object with an accompanying amplification of the power applied to the second object.

It is a general object of the invention to provide, for use in such systems, a receiving unit in which sensitive control of the amplified quantity can be obtained throughout the required range of values of the quantity being reproduced without the use of relays and the electrical contacts necessarily associated therewith, the unit being of simple construction and having a relatively small number of mechanical elements for actuating such electric contacts as are required for controlling the servomotor of the unit. The invention is particularly adapted for use in connection with receivers in which the torque decreases to zero when they are at the points of synchronism with their transmitters.

Figure 1:
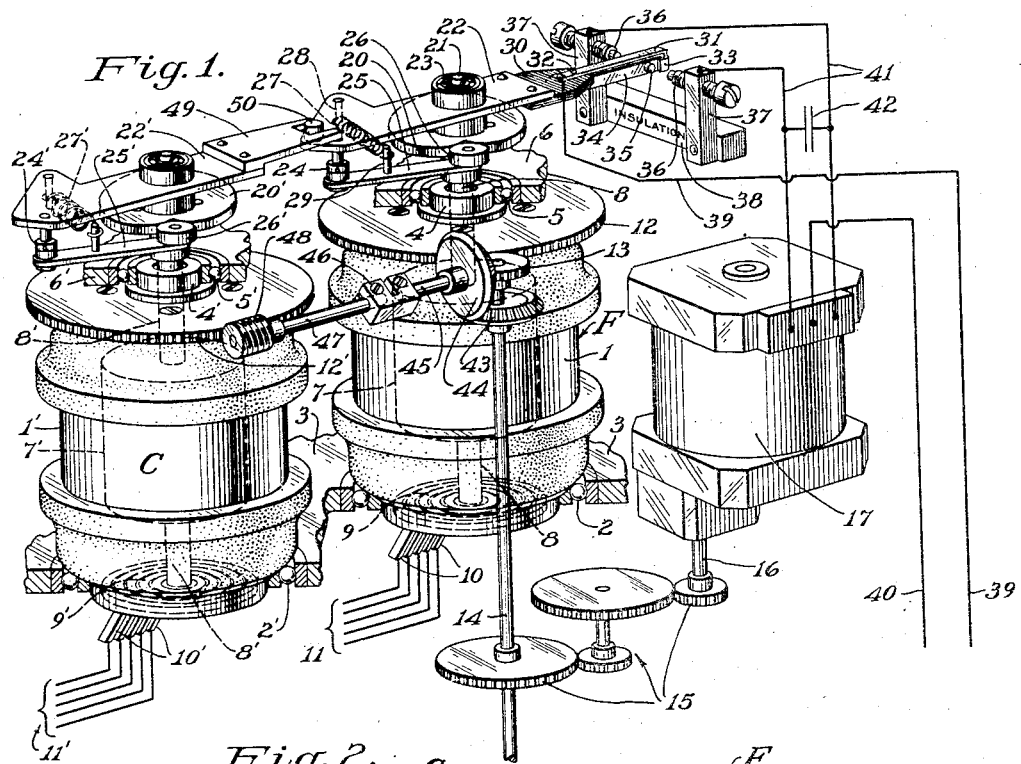
Figure 2:
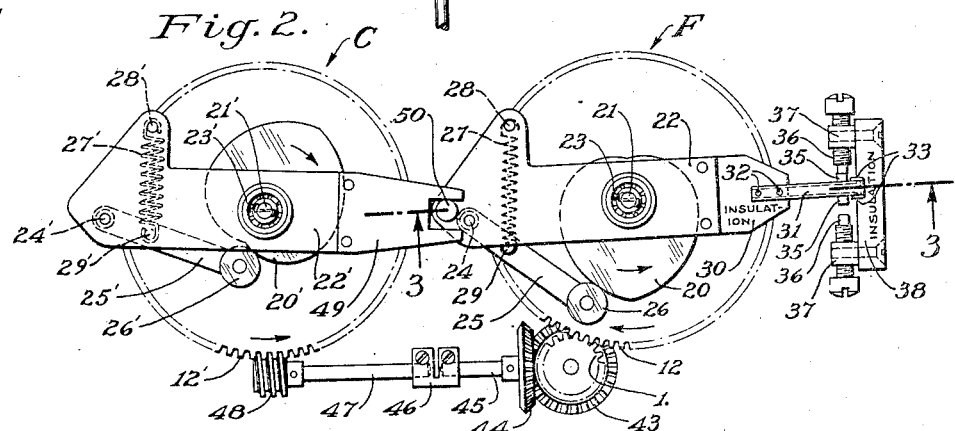
Figure 3:
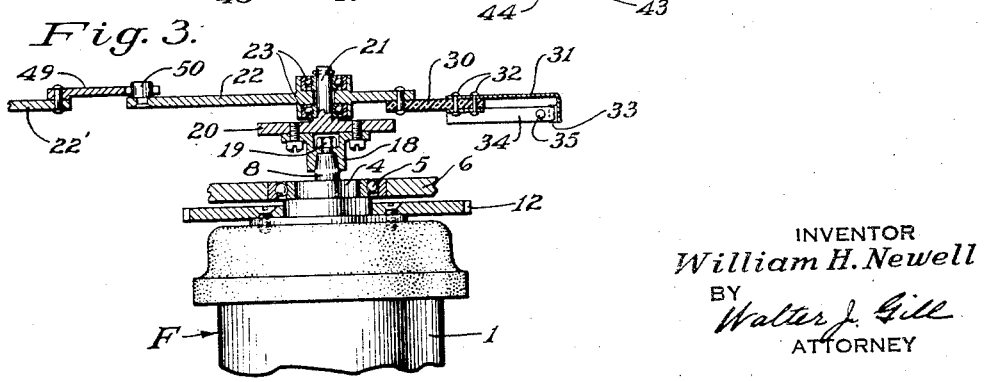

The particular nature of the invention, as well as other objects and advantages thereof, will appear most clearly from a description of a preferred embodiment thereof as shown in the accompanying drawing in which Fig. 1 is a perspective view of the unit with certain parts broken away or shown in cross section to more clearly reveal parts that would otherwise be concealed;

Fig. 2 is a plan view of the receivers of the unit and certain elements associated therewith, and Fig. 3 is a view in elevation of one of the receivers with the associated elements shown in section along the line 3—3 of Fig. 2.

Referring to the drawing, C indicates in general the coarse receiver of the unit and F the fine receiver such as are commonly provided in receiver units of this type, these receivers being shown for purposes of illustration as being of the well-known Selsyn type.

Describing the fine receiver F, 1 indicates the stator which by means of ball bearings 2, is rotatably supported on a lower fixed plate 3. The top of the stator is provided with a hub 4 which by means of ball bearings 5 is rotatably mounted within an upper fixed plate 6. The rotor 7 of the receiver is rotatably mounted within the stator by a shaft 8 and suitable bearings which are not shown. In order that the stator and rotor may be energized a plurality of slip rings 9 are provided, it being understood that suitable connections therefrom to the rotor and winding of the stator are provided. The inner two of these slip rings are fixed to the rotor shaft and the three outer ones are fixed to the stator, this arrangement being employed to allow for the relative motion between the stator and the rotor and between the stator and the plates 3 and 6 between which it is supported. Current is supplied to the slip rings through brushes 10 having connected thereto conductors 11 leading to the transmitters which control the receiver unit.

A gear 12 is attached to the top of the stator and engages a pinion 13 on the upper end of a shaft 14, the lower end of which leads to the object at which the desired motion is to be reproduced, this object not being shown as it forms no part of the present invention. The shaft 14 is connected through a train of gears 15 to the rotor shaft 16 of the servomotor 17 which is shown herein as a single phase induction motor of the capacity type.

Referring particularly to Fig. 3, the upper end of the rotor shaft 8 is tapered to receive a correspondingly tapered cap 18 which is clamped upon the end of the shaft by a nut 19 and to which is attached by screws a heart cam 20 provided with a spindle 21. An arm 22 is rotatably mounted on the spindle by means of ball bearings 23. As shown most clearly in Fig. 1 the arm 22 carries near one end a depending stud 24 to which is pivoted one end of a follower arm 25 carrying at its other end a roller 26 which is held against the periphery of the heart cam 20 by a spring 27 connected to a pin 28 attached to the arm 22 and a pin 29 attached to the follower arm 25.

The other end of arm 22 has attached thereto a plate 30 of insulation to which is attached one end of an arm 31 by rivets 32. The other end of arm 31 is bent downwardly and provided with inwardly extending lugs 33. A pair of flexible arms 34 is attached to the plate 30 by the rivets 32 which also provide an electrical connection between these arms and the arm 31. The free end of each arm 34 terminates adjacent the corresponding lug 33 and is provided with a contact element 35 adapted to co-act with an adjustably fixed contact 36 carried on a post 37, the two posts being mounted upon an insulating support 38. Conductor 39 is attached to the inner end of arm 31 and leads to a source of single phase current. The other conductor 40 leading from the source of current is connected to a common terminal of the stator windings of the motor 17. The other terminals of the windings are connected by conductors 41 to the contacts 36 and a condenser 42 is connected between these conductors.

For convenience and since the elements of the coarse receiver C, are similar to those of fine receiver F, the common elements of these receivers are given the same numbers, but with primes affixed, as those which the corresponding elements of the fine receiver bear. Under these circumstances the coarse receiver will not be described in detail except in so far as may hereinafter be necessary.

In order that the stator 1' of the coarse receiver C may be driven from the servomotor 17, the shaft 14 is provided with a bevel gear 43 engaging a bevel gear 44 on the shaft 45, which has adjustably attached to its free end one part of a coupling device 46, the other part of which is adjustably attached to one end of a shaft 47 which carries at its other end a worm 48 engaging the gear 12' of the coarse receiver. The coupling device provides for an accurate adjustment between the stators of the receivers so that they will be driven in proper relation. The arm 22' of the coarse receiver is like the corresponding arm of the fine receiver but has attached thereto a plate 49 having at its free end a recess within which is located a pin on the end of arm 22, thus providing a lost motion connection between the arms 22 and 22'.

In the operation of the apparatus described above and assuming that changes in the value of the quantity received at the unit are relatively small, the corresponding changes in the electrical input to the fine receiver F will cause its rotor to turn relatively to its stator in one direction or the other from its neutral position. As the rotor turns the heart cam 20 attached to its shaft will turn with it as will also the arm 22, since it is at this time held in relatively fixed relation to the cam by the action of the spring 27 which holds the roller 26 on the follower arm 25 in the notch in the periphery of the cam. The arm 22 will accordingly turn with the rotor of the receiver until one or the other of contacts 35 engages the corresponding adjustably fixed contact 36. When this occurs the roller 26 will ride out of the notch in the heart cam on to the adjacent portion of its periphery and the contacts will be held in firm engagement by the action of the spring 27 and the resiliency of the contact arm 34. A circuit will then be established including conductor 39, arm 31, the rivets 32, the contact arm 34 and contact element 35 and the adjustable contact 36 with which the latter is in engagement, the corresponding post 37 and conductor 41 to a field winding of the servomotor and thence to the source of current through the conductor 40.

As a result of the energization of the field winding of the servomotor, its rotor will turn and through shaft 16, gear train 15, shaft 14 and pinion 13, the stator 1 will be accordingly turned, but in a reverse direction to that in which the rotor 7 had previously turned. Owing to the nature of the receiver, its rotor will continue to maintain its relative position with respect to the stator as the latter turns, so that when the stator has turned through an angle equal to that through which the rotor originally turned, the contact device will resume its neutral position and thus open the circuit of the servomotor to cause the movement of the stator to cease. The elements associated with the rotor of the receiver will then be restored to their normal unified relationship until again actuated by a change in the electrical input to the fine receiver F.

While the servomotor is driving the stator of the fine receiver to restore the elements to their normal relationship, it will also have driven the device attached to shaft 14 by an amount equivalent to the change in value transmitted electrically to the receiver motor. This has been accomplished without any load on the receiver motor at the point of synchronism, although there will be some load on it while the contact device is held against one or the other of the fixed contacts.

During the operation of the fine receiver as described above, there will be a movement of the rotor of the coarse receiver C in proportion to the transmission ratio between the coarse and fine transmitters which control the receivers. The width of the recess in the end of the arm 49 will be so proportioned with relation to the diameter of pin 50, that neither side of the recess will, under the assumed conditions, engage or displace pin 50. Since the coarse receiver has, under these conditions, no effect upon the arm 22 of the fine receiver, the latter receiver will control the servomotor for the assumed small changes in the quantity received.

The particular unit shown herein is so designed that if a change in the quantity received at it is greater than about one-third of a revolution of the rotor of the fine receiver F, the coarse receiver C will take control of the servomotor in the following manner. The initial movement of the rotor of the fine receiver F will, as above described, establish the circuit of the servomotor through one or the other of the contacts 35, the corresponding fixed contact 36 and the conductor 41 leading therefrom to the servomotor. Assuming that the rotor of the fine receiver turns so rapidly that it will complete substantially a third of a revolution before the servomotor can correspondingly turn the stator of this receiver to open the circuit of the servomotor, the simultaneous turning of the rotor of the coarse receiver will cause enough movement of its arm 22' to cause one side of the recess in arm 49 to engage and displace the pin 50 sufficiently to hold the contact element 35 in engagement with its fixed contact 36 to maintain the closed circuit of the servomotor 17, previously established by the initial operation of the fine receiver. The servomotor will then drive the stators of the two receivers until the stator of the coarse receiver has been turned far enough to release the pin 50 by the accompanying movement of the rotor of this receiver. When this occurs, the fine receiver will again take control of the servomotor as previously described.

The spring 27' of the coarse receiver must be strong enough to hold either one or the other of the contact elements 35 in engagement with the corresponding fixed contact 36, according to the direction of rotation of the rotor of the coarse receiver. This means that the spring 27' must, when the coarse receiver is in control of the servomotor, overcome the spring 27 of the fine receiver so that the latter will be prevented from opening the circuit of the servomotor due to the movement of the rotor of the fine receiver which takes place simultaneously with that of the rotor of the coarse receiver.

The conditions described immediately above, that is, when the coarse receiver C is in control, are indicated in Fig. 2. The heart cam 20 of the fine receiver is shown as having been turned counterclockwise by more than one-third of a revolution from its neutral position where roller 26 lies in the notch. At the same time the heart cam 20' of the coarse receiver has turned clockwise by an amount indicated by the displacement of its roller 26' from the notch in the cam. This displacement is sufficient to cause the arm 22' to be turned far enough for a side of the recess in the arm 49 to engage and displace the pin 50 and consequently the arm 22 of the fine receiver, to a position to establish a circuit of the servomotor, as long as the described conditions exist.

While a preferred embodiment of the invention has been shown and described, it will be understood that the invention may be embodied in other forms and that various changes may be made in structural details without departing from its principles as defined in the appended claims.

I claim:

1. In a receiver unit for use in a system including a pair of controlling transmitters and an object to be actuated in accordance with the operation of the transmitters, the combination of a pair of receivers each having an element responsive to one of the transmitters and an element for energizing the responsive element, driving connections between the energizing elements of the receivers, a motor for operating the object and the driving connections, a contact device for controlling the motor, mechanism associated with the responsive element of one of the receivers for controlling the contact device under certain conditions and mechanism associated with the responsive element of the other receiver for controlling the first named mechanism and the contact device independently of the said one of the receivers under other conditions.

2. In a receiver unit for use in a system including a pair of controlling transmitters and an object to be actuated in accordance with the operation of the transmitters, the combination of fine and coarse receivers each having an element responsive to one of the transmitters and an element for energizing the responsive element, driving connections between the energizing elements of the receivers, a motor for operating the object and the driving connections, a contact device for controlling the motor, mechanism associated with the responsive element of the fine receiver for controlling the contact device under certain conditions and mechanism associated with the responsive element of the coarse receiver for controlling the first named mechanism and the contact device independently of the fine receiver under other conditions.

3. In a receiver unit for use in a system including a pair of controlling transmitters and an object to be actuated in accordance with the operation of the transmitters, the combination of a pair of receivers each having an element responsive to one of the transmitters and an element for energizing the responsive element, driving connections between the energizing elements of the receivers, a motor for operating the object and the driving connections, a contact device for controlling the motor, mechanism associated with the responsive element of one of the receivers for controlling the contact device when the changes in the value of the quantity received at the unit are less than a predetermined amount and mechanism associated with the responsive element of the other receiver for controlling the first named mechanism and the contact device independently of the said one of the receivers when the changes in the value exceed the predetermined amount.

4. In a receiver unit for use in a system including a pair of controlling transmitters and an object to be actuated in accordance with the operation of the transmitters, the combination of a servomotor, a pair of self synchronous receivers each having an element responsive to one of the transmitters and an element operable by the servomotor, a driving connection between the object and the servomotor, a contact device for controlling the energization of the servomotor, mechanism associated with the responsive element of one of the receivers for actuating the device and mechanism associated with the responsive element of the other receiver for actuating the first mechanism and the device independently of the first named receiver.

5. In a receiver unit for use in a system including a pair of controlling transmitters and an object to be actuated in accordance with the operation of the transmitters, the combination of a servomotor, a pair of self-synchronous receivers each having an element responsive to one of the transmitters and an element operable by the servomotor, a driving connection between the object and the servomotor, a contact device for controlling the energization of the servomotor, a member attached to the responsive element of each of the receivers, a second member movably mounted with respect to each of the first named members, a yieldable operating connection between each pair of members, the second member of one of the receivers carrying a part of the contact device, and a lost motion connection between the second members of the two receivers.

6. In a receiver unit for use in a system including fine and coarse controlling transmitters and an object to be actuated in accordance with the operation of the transmitters, the combination of a servomotor, fine and coarse self-synchronous receivers each having an element responsive to the corresponding transmitter and an element operable by the servomotor, a driving connection between the object and the servomotor, a contact device for controlling the energization of the servomotor, a member attached to the responsive element of the fine receiver, a second member movably mounted with respect to the first named member, a yieldable operating connection between the members, the second member carrying a part of the contact device, a third member attached to the responsive element of the coarse receiver, a fourth member movably mounted with respect to the third member, a yieldable operating connection between the third and fourth members and a lost motion connection between the second and fourth members of the receivers.

7. In a receiving unit of the follow-up type, the combination of fine and coarse receivers each having a rotor and a movable stator, driving connections between the stators, a servomotor for operating the driving connections, an electrical contact device for controlling the energization of the servomotor, mechanism under the control of the rotor of the fine receiver for controlling the operation of the device when the changes in the values of the quantity received at the unit are less than a predetermined amount and means under the control of the rotor of the coarse receiver for controlling the operation of the mechanism and the contact device independently of the rotor of the fine receiver when the changes in the value exceed the predetermined amount.

8. In a receiver unit for use in a system including a pair of controlling transmitters and an object to be actuated in accordance with the operation of the transmitters, the combination of a pair of receivers each including a rotor element responsive to one of the transmitters and a movable field element co-acting therewith, driving connections between the field elements of the receivers, a motor for operating the driving connections and the object, a contact device for controlling the motor, mechanism under the control of the rotor element of one of the receivers for controlling the contact device under certain conditions and means under the control of the rotor element of the other receiver for controlling the operation of the mechanism and the contact device independently of the first element of the first named receiver under other conditions.

9. In a receiving unit, coarse and fine receivers, each having a rotor and a rotatable stator, a servomotor for moving an object in consonance with the operation of at least one of said receivers, a contact device for controlling the energization of the servomotor, mechanism operable by the rotor of one of the receivers for actuating the contact device, mechanism operable by the rotor of the other receiver for actuating the first named mechanism and thereby the contact device and means operable by the servomotor to rotate the stators of the receivers proportionately to and in a direction opposite to the rotation of their rotors.

10. In a receiving unit, coarse and fine receivers, each having a rotor and a rotatable stator, a servomotor for moving an object in consonance with the operation of at least one of said receivers, a contact device for controlling the energization of the servomotor, mechanism operable by the rotor of the fine receiver for actuating the contact device when the displacement of the rotor is less than a predetermined amount, mechanism operable by the rotor of the coarse receiver for actuating the first named mechanism and thereby the contact device when the displacement of this rotor is greater than the predetermined amount and means operable by the servomotor to rotate the stators of the receivers proportionately to and in a direction opposite to the rotation of their rotors.

WILLIAM H. NEWELL.